(12) United States Patent
Huang

(10) Patent No.: US 11,372,957 B2
(45) Date of Patent: Jun. 28, 2022

(54) METHOD AND DEVICE FOR STARTING APPLICATION BASED ON FINGERPRINT RECOGNITION

(71) Applicant: SHANGHAI HARVEST INTELLIGENCE TECHNOLOGY CO., LTD, Shanghai (CN)

(72) Inventor: Jinadong Huang, Shanghai (CN)

( * ) Notice: Subject to any disclaimer, the term of this patent is extended or adjusted under 35 U.S.C. 154(b) by 0 days.

(21) Appl. No.: 16/469,646

(22) PCT Filed: Mar. 6, 2018

(86) PCT No.: PCT/CN2018/078089
§ 371 (c)(1),
(2) Date: Jun. 14, 2019

(87) PCT Pub. No.: WO2018/177083
PCT Pub. Date: Oct. 4, 2018

(65) Prior Publication Data
US 2020/0019684 A1 Jan. 16, 2020

(30) Foreign Application Priority Data
Mar. 29, 2017 (CN) .......................... 201710197881.4

(51) Int. Cl.
*G06F 21/32* (2013.01)
*G06F 21/62* (2013.01)
(Continued)

(52) U.S. Cl.
CPC ............ *G06F 21/32* (2013.01); *G06F 3/0482* (2013.01); *G06F 3/0486* (2013.01);
(Continued)

(58) Field of Classification Search
CPC .. G06F 21/32; G06F 3/04166; G06F 3/04817; G06F 3/0482; G06F 3/0486;
(Continued)

(56) References Cited

U.S. PATENT DOCUMENTS 9,703,941 B2 * 7/2017 Lee ........................ G06F 1/1684
9,946,861 B2 * 4/2018 Yoon ....................... G06F 21/32
(Continued)

FOREIGN PATENT DOCUMENTS

CN 105677337 A * 6/2016

*Primary Examiner* — Michael Pyzocha

(57) ABSTRACT

A fingerprint recognition-based application starting method and device. A sensing unit (102) is provided below a fingerprint recognition area of a display unit (101), so that when a user operates an application icon on the screen, fingerprint information of the user can be acquired, and then the acquired fingerprint information is compared with preset fingerprint information, to start an application or perform unlocking. Compared with an existing approach for a mobile apparatus to start an application by means of fingerprint recognition, the present invention improves the operability of application icons on a screen and enhances user experience, and can also effectively reduce the overall thickness of a mobile apparatus, making the mobile apparatus thinner and lighter to meet the market demands.

22 Claims, 5 Drawing Sheets

(51) Int. Cl.
*G06F 3/041* (2006.01)
*G06F 3/04817* (2022.01)
*G06F 3/0482* (2013.01)
*G06F 3/0486* (2013.01)
*G06V 40/13* (2022.01)

(52) U.S. Cl.
CPC ...... *G06F 3/04166* (2019.05); *G06F 3/04817* (2013.01); *G06F 21/629* (2013.01); *G06V 40/13* (2022.01)

(58) Field of Classification Search
CPC ........ G06F 21/629; G06F 9/44; G06F 3/0481; G06F 21/62; G06F 3/04886; G06F 21/121; G06K 9/00013; G06K 9/00006
See application file for complete search history.

(56) References Cited

U.S. PATENT DOCUMENTS

| | | | | |
|---|---|---|---|---|
| 10,719,689 | B2* | 7/2020 | Xu | G06F 3/0416 |
| 2003/0007017 | A1* | 1/2003 | Laffey | G06F 3/04842 |
| | | | | 715/862 |
| 2009/0093277 | A1* | 4/2009 | Lee | G06F 3/04817 |
| | | | | 455/566 |
| 2014/0173485 | A1* | 6/2014 | Ju | G06F 3/0488 |
| | | | | 715/769 |
| 2014/0181959 | A1* | 6/2014 | Li | G06F 21/32 |
| | | | | 726/19 |
| 2014/0292666 | A1* | 10/2014 | Shi | G06F 21/32 |
| | | | | 345/173 |
| 2014/0359757 | A1* | 12/2014 | Sezan | G06F 3/04886 |
| | | | | 726/19 |
| 2015/0135108 | A1* | 5/2015 | Pope | G06F 3/0481 |
| | | | | 715/767 |
| 2015/0324625 | A1* | 11/2015 | Mo | G06F 3/0488 |
| | | | | 382/124 |
| 2016/0042166 | A1* | 2/2016 | Kang | G06F 3/0488 |
| | | | | 726/7 |
| 2016/0063230 | A1* | 3/2016 | Alten | H04L 63/0861 |
| | | | | 726/28 |
| 2017/0153743 | A1* | 6/2017 | Kim | G02B 6/0036 |
| 2017/0213019 | A1* | 7/2017 | Mao | G06F 3/0488 |
| 2017/0228576 | A1* | 8/2017 | Kim | G06K 9/0004 |
| 2017/0308732 | A1* | 10/2017 | Wang | G06F 3/0488 |
| 2018/0101715 | A1* | 4/2018 | Lee | G06K 9/00013 |
| 2018/0181735 | A1* | 6/2018 | Yang | G06F 21/36 |
| 2018/0196931 | A1* | 7/2018 | Cho | G06F 3/0412 |
| 2018/0232092 | A1* | 8/2018 | Lee | G06F 21/31 |
| 2018/0365477 | A1* | 12/2018 | Seol | H04M 1/725 |
| 2019/0324640 | A1* | 10/2019 | Park | G06F 3/0482 |
| 2019/0354661 | A1* | 11/2019 | Lu | G06F 21/84 |

* cited by examiner

Device for starting an application based on fingerprint recognition

Display unit 101

Sensing unit 102

Backlight unit 103

Fingerprint information setting unit 104

Operating instruction receiving unit 105

Processing unit 106

Fig.3

METHOD AND DEVICE FOR STARTING APPLICATION BASED ON FINGERPRINT RECOGNITION

BACKGROUND OF THE INVENTION

1. Field of the Invention

The present invention relates to the field of electronic equipment application, and particularly relates to a method and a device for starting an application based on fingerprint recognition.

2. Description of the Prior Art

With development of science and technology and advances in technology, touch screen displays have been widely applied in devices with human-computer interaction interfaces, such as operating screens of industrial computers, touch screens of tablet computers and smartphones and the like. Since these devices are often accompanied by a large amount of user information during use, protection for information security is particularly important. Fingerprint recognition encryption is an important one of many information security protection modes.

Most of the existing fingerprint recognition technologies still stay in a boot-up unlocking or screen unlocking function of a terminal, so a special button (e.g., the home button of iPhone) needs to be set, and a capacitive fingerprint recognition sensor is placed under the button for collecting fingerprints left by a user on the button. Due to the capacitive fingerprint recognition sensor needs to be set, the complexity for processing and installation of the terminal is increased on one hand, the overall thickness of the terminal is increased on the other hand, thereby limiting the development of thinning, full-screen and rollable application of a terminal screen.

At present, encryption and starting of applications mostly still stay in entering a password or presetting a sliding track to complete screen unlocking. Compared with the biometrics-based fingerprint recognition, these encryption modes are more easily cracked and cannot guarantee the information security. Even if the foregoing fingerprint recognition mode is introduced, the fingerprint must be verified by a sensor outside a display screen to start the application, so the process of starting the application is still limited by shortcomings of the sensor mentioned above, and the operation experience of the user cannot be improved.

SUMMARY OF THE INVENTION

A technical problem to be solved by the present invention is to provide a technical solution for starting an application based on fingerprint recognition, for solving a problem of high risk of information being easily cracked in an existing mode for starting the application, improving a device with a fingerprint recognition function to realize user experience of thinned and full-screen human-computer interaction interface, and simultaneously satisfying multiple needs of privacy security and sensory experience of the user.

In order to solve the above technical problem, the technical solution adopted by the present invention is a method for starting an application based on fingerprint recognition. The method is applied to a device for starting the application based on fingerprint recognition. The device includes a display unit and sensing units, wherein the display unit is provided with a fingerprint recognition region; the sensing units are located below the fingerprint recognition region for acquiring fingerprint information on the fingerprint recognition region. The method includes the following steps:

presetting a correspondence between the application icon and the fingerprint information;

receiving operating information of the user for the application icon and moving the application icon to the fingerprint recognition region; and acquiring the fingerprint information of a current user on the fingerprint recognition region; judging whether the acquired fingerprint information is successfully matched with the preset fingerprint information corresponding to the application icon; and if yes, starting the application corresponding to the application icon, otherwise not starting the application corresponding to the application icon.

Further, the step of "presetting the correspondence between the application icon and the fingerprint information" includes:

receiving a setting instruction of the user and displaying the fingerprint recognition region;

acquiring and saving the fingerprint information of the user on the fingerprint recognition region; and displaying an application list, receiving a selecting instruction of the user for the application icon, establishing and saving the correspondence between the selected application icon and the acquired fingerprint information.

Further, an initial position of the application icon is located at a periphery of the fingerprint recognition region. The step of "receiving the operating information of the user for the application icon and moving the application icon to the fingerprint recognition region" includes:

receiving a dragging instruction of the user for the application icon and moving the application icon from the initial position to the fingerprint recognition region.

Further, the initial position of the application icon is located at the periphery of the fingerprint recognition region. The step of "receiving the operating information of the user for the application icon and moving the application icon to the fingerprint recognition region" includes:

receiving a touching instruction of the user for the application icon and moving the application icon from the initial position to the fingerprint recognition region, wherein the touching instruction includes a clicking instruction or a button moving instruction.

Further, the method includes the following step:

sending prompt information when the preset fingerprint information matched with the acquired fingerprint information is not recognized.

Further, the prompt information includes one or more of voice prompt information, image prompt information, light prompt information and video prompt information.

Further, the method includes:

starting an application icon sorting function to sort the application icon when a time of acquiring the fingerprint information of the user on the fingerprint recognition region exceeds a preset time threshold.

Further, the process of "sorting the application icon" includes: receiving a coordinate movement instruction of the user for the application icon, and moving the application icon from a current position to a target position.

Further, the display unit includes an Active Matrix Organic Light Emitting Diode (AMOLED) display screen or a Liquid Crystal Display (LCD) screen.

Further, when the display unit is the LCD screen, a backlight unit is further arranged below the sensing units; and the sensing units are arranged between the backlight unit and the LCD screen.

Further, each sensing unit includes a TFT (Thin Film Transistor) image sensing array film.

Further, the application includes one or more of images, videos, audios and mobile terminal software.

Further, the fingerprint recognition region includes a plurality of fingerprint recognition sub-regions; and one sensing unit is correspondingly arranged below each of the fingerprint recognition sub-regions.

Further, the device includes a sensing unit control circuit. The method further includes:

receiving a starting instruction of the user for the fingerprint recognition sub-regions; turning on the sensing units below the fingerprint recognition sub-regions by the sensing unit control circuit; receiving a turn-off instruction of the user for the fingerprint recognition sub-regions; and turning off the sensing units below the fingerprint recognition sub-regions by the sensing unit control circuit.

The inventor also provides a device for starting an application based on fingerprint recognition. The device includes a display unit and sensing units, wherein the display unit is provided with a fingerprint recognition region; and the sensing units are located below the fingerprint recognition region for acquiring fingerprint information on the fingerprint recognition region. The device further includes a fingerprint information setting unit, an operating instruction receiving unit and a processing unit.

The fingerprint information setting unit is configured to preset a correspondence between the application icon and the fingerprint information.

The operating instruction receiving unit is configured to receive operating information for the application icon and move the application icon to the fingerprint recognition region.

The sensing units are configured to acquire the fingerprint information of a current user located on the fingerprint recognition region. The processing unit is configured to compare the acquired fingerprint information with the preset fingerprint information corresponding to the application icon, and if match successfully, start the application corresponding to the application icon, otherwise not start the application corresponding to the application icon.

Further, "the fingerprint information setting unit is configured to preset the correspondence between the application icon and the fingerprint information" includes:

the operating instruction receiving unit is configured to receive a setting instruction of the user; the display unit is configured to display the fingerprint recognition region;

the sensing units are configured to acquire and save the fingerprint information of the user on the fingerprint recognition region;

the display unit is configured to display an application list; the operating instruction receiving unit is configured to receive a selecting instruction of the user for the application icon; and the processing unit is configured to establish and save the correspondence between the selected application icon and the acquired fingerprint information.

Further, the initial position of the application icon is located at the periphery of the fingerprint recognition region. The operating instruction receiving unit is configured to receive the dragging instruction for the application icon and move the application icon from the initial position to the fingerprint recognition region.

Further, the initial position of the application icon is located at the periphery of the fingerprint recognition region. The operating instruction receiving unit is configured to receive the touching instruction of the user for the application icon and move the application icon from the initial position to the fingerprint recognition region. The touching instruction includes the clicking instruction or the button moving instruction.

Further, the processing unit is further configured to send prompt information when the preset fingerprint information matched with the acquired fingerprint information is not recognized.

Further, the prompt information includes one or more of voice prompt information, image prompt information, light prompt information and video prompt information.

Further, the processing unit is further configured to start an application icon sorting function to sort the application icon when a time of acquiring the fingerprint information of the user on the fingerprint recognition region exceeds a preset time threshold.

Further, "the processing unit is configured to sort the application icon" includes: the processing unit is configured to receive a coordinate movement instruction of the user for the application icon and move the application icon from a current position to a target position.

Further, the display unit includes an AMOLED display screen or an LCD screen.

Further, when the display unit is the LCD screen, a backlight unit is further arranged below the sensing units; and the sensing units are arranged between the backlight unit and the LCD screen.

Further, each sensing unit includes a TFT image sensing array film.

Further, the application includes one or more of images, videos, audios and mobile terminal software.

Further, the fingerprint recognition region includes a plurality of fingerprint recognition sub-regions; and one sensing units are correspondingly arranged below each of the fingerprint recognition sub-regions.

Further, the device includes a sensing unit control circuit. The operating instruction receiving unit is further configured to receive a starting instruction of the user for the fingerprint recognition sub-regions. The sensing unit control circuit is configured to turn on the sensing units below the fingerprint recognition sub-regions. The operating instruction receiving unit is configured to receive a turn-off instruction of the user for the fingerprint recognition sub-regions. The sensing unit control circuit is configured to turn off the sensing units below the fingerprint recognition sub-regions by the sensing unit control circuit.

The present invention has the following advantages: the sensing units are arranged below the fingerprint recognition region of the display unit, so when a user operates the application icons on the screen, the sensing units may immediately collect the fingerprint information of the user, and then compare the collected fingerprint information with the preset fingerprint information to implement starting or unlocking of the application. Compared with a mode that the fingerprint must be verified by the sensor outside the display screen before starting the application in existing mobile terminal equipment, the method provided by the invention improves operability of the user to directly unlock the application icon on the screen by fingerprint and improves the user experience on one hand, and may realize a function of fingerprint recognition in the screen by means of the operability for full-screen, thinned and lightened terminals to meet the needs of the market on the other hand.

BRIEF DESCRIPTION OF THE DRAWINGS

FIG. 3 is a schematic diagram of a device for starting an application based on fingerprint recognition according to an embodiment of the present invention;

LIST OF REFERENCE NUMERALS

101. display unit;
102. sensing unit;
103. backlight unit;
104. fingerprint information setting unit;
105. operating instruction receiving unit; and
106. processing unit.

DESCRIPTION OF THE INVENTION

Technical contents, structural features, implemented objectives and effects of the present invention will be described in detail below in combination with embodiments and with reference to the accompanying drawings.

Figure 1:
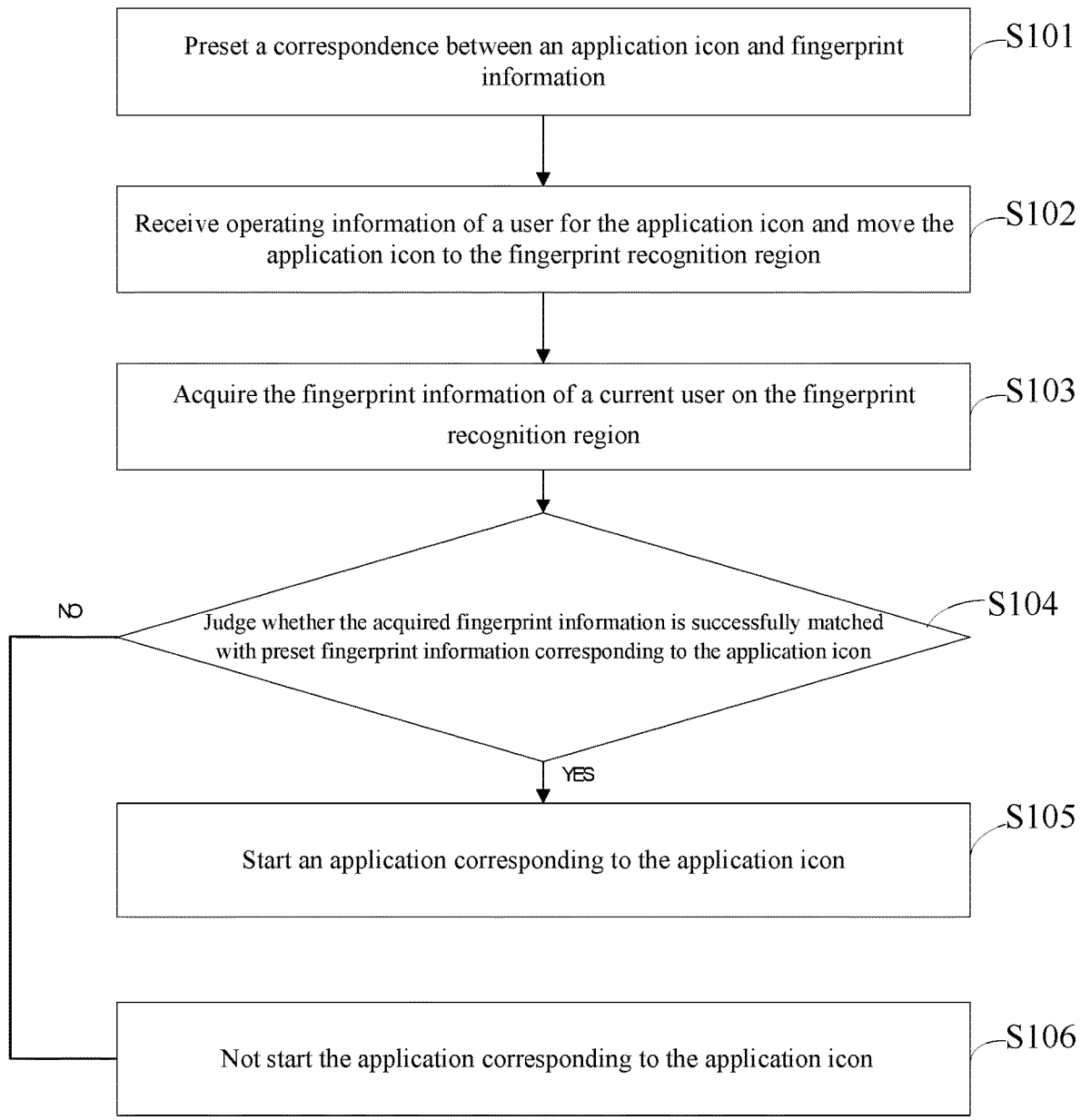
FIG. 1 is a flow chart of a method for starting an application based on fingerprint recognition according to an embodiment of the present invention.

As seen from FIG. 1, it is a flowchart of a method for starting an application based on fingerprint recognition according to an embodiment of the present invention. The method is applied to a device for starting the application based on fingerprint recognition. The device is electronic equipment with a touch display screen, such as a mobile phone, a table computer, a personal digital assistant and other smart mobile equipment, and may also be a personal computer, a computer for industrial equipment or other electronic equipment.

The device includes a display unit 101 and sensing units 102, wherein the display unit 101 is provided with a fingerprint recognition region; and the sensing units 102 are located below the fingerprint recognition region for acquiring fingerprint information on the fingerprint recognition region. In the present embodiment, the display unit includes an AMOLED display screen or an LCD screen. In other embodiments, the display unit may also be other electronic components having a display function. The method includes the following steps:

First, the process proceeds to a step S101 of presetting a correspondence between the application icon and the fingerprint information. The application icon may be a thumbnail or shortcut of the application; each application icon corresponds to one application; and a starting instruction for the application is triggered when a user clicks on the application icon. In the present embodiment, the application includes one or more of images, videos, audios and mobile terminal software (e.g., various APPs on a mobile phone). The preset fingerprint information is the fingerprint information entered and stored by the user in advance, wherein each fingerprint information may be associated with one or more application icons; and the correspondence between the application icon and the fingerprint information is stored. The correspondence between the application icon and the fingerprint information may be stored in a storage unit of the device, such as a memory of the mobile phone or a hard disk of the computer, and may also be stored in the storage unit of a server. The device only needs to establish a communication connection with the server and then acquires the prestored fingerprint information from the server when the correspondence between the preset application icon and the fingerprint information needs to be acquired. The communication connection includes a wired communication connection or a wireless communication connection.

Then, the process proceeds to a step S102 of receiving operating information of the user for the application icon and moving the application icon to the fingerprint recognition region. In the present embodiment, the initial position of the application icon is located at the periphery of the fingerprint recognition region, wherein the application icon refers to an application icon corresponding to the application which needs to be unlocked or started. For other application icons, the initial positions on the screen are not limited, i.e., may be located at the periphery of the fingerprint recognition region or in the fingerprint recognition region.

In some embodiments, the step of "receiving the operating information of the user for the application icon and moving the application icon to the fingerprint recognition region" includes: a dragging instruction of the user for the application icon is received; and the application icon is moved from the initial position to the fingerprint recognition region. The user can first click to select the application icon to be moved, then directly move the application icon from the initial position to the fingerprint recognition region by sliding of a finger, and trigger the dragging instruction. Certainly, the user can also move the application icon to the fingerprint recognition region after selecting the application icon to be moved and moving a certain touch track, to trigger the dragging instruction. In short, a sliding track of the application icon can be customized according to preferences of the user as long as an end point of the application icon after moving is ensured to be located within the range of the fingerprint recognition region.

In some embodiments, the initial position of the application icon is located at the periphery of the fingerprint recognition region. The step of "receiving the operating information of the user for the application icon and moving the application icon to the fingerprint recognition region" includes: the touching instruction of the user for the application icon is received; and the application icon is moved from the initial position to the fingerprint region. The touching instruction includes the clicking instruction or the button moving instruction.

When the touching instruction is the clicking instruction, the step S102 may be implemented in a mode of setting the correspondence between the number of contacts of the application icon and a touch command, triggering the clicking instruction when detecting that the number of contacts meets requirements, and moving the application icon from the initial position to the fingerprint recognition region. For example, the user can preset the clicking instruction of quick double click to trigger the application icon to move, so the user just needs quick double click on the application icon corresponding to the application on the screen to quickly move the application icon from the initial position to the fingerprint recognition region when needing to unlock or start the application. In addition, the user can also trigger the clicking instruction in a mode of setting a preset button, e.g., a "move" button may be additionally set on the screen, and clicking on the "move" button to quickly move the application icon to the fingerprint recognition region after the user clicks to select the application icon to be moved.

When the touching instruction is the button moving instruction, the step S102 can be implemented in a mode of displaying a virtual manipulation keyboard containing direction keys (for example, including four directions up, down, left and right) on the screen after the user selects the application icon corresponding to the application to be unlocked or started, receives operations of the user on a direction key "up" of the virtual keyboard, and moves the application icon from the initial position to the fingerprint recognition region. In addition, for the device with a mechanical button, the operating instruction of the user on the mechanical button is received to move the application icon from the initial position to the fingerprint recognition region after the user selects the application icon corresponding to the application to be unlocked or started.

Then, the process proceeds to a step S103 of acquiring the fingerprint information of the current user on the fingerprint recognition region. When the device receives the dragging instruction of the user, the sensing units may synchronously collect the fingerprint information of the user when a hand of the user is located within a range of the fingerprint recognition region due to the hand of the user moves away from the screen after the application icon is moved from the initial position to the fingerprint recognition region and the sensing units are arranged below the sensing units. When the device receives the touching instruction of the user, the user can press the fingerprint recognition region with the hand again after the application icon of the application to be unlocked or started is moved to the fingerprint recognition region, so that the device can receive the fingerprint information of the user.

Then, the process proceeds to a step S104 of judging whether the acquired fingerprint information is successfully matched with the preset fingerprint information corresponding to the application icon, and if yes, proceeding a step S105 of starting the application corresponding to the application icon, otherwise proceeding a step S106 of not starting the application corresponding to the application icon. Comparison of the fingerprint information may be implemented by a fingerprint recognition algorithm, which may be stored in the storage unit of the device. A processor of the device will take the fingerprint recognition algorithm in the storage unit after the sensing units acquire the fingerprint information on the fingerprint recognition region, and compare the acquired fingerprint information with the preset fingerprint information to judge whether the two are matched. The fingerprint recognition algorithm includes steps of fingerprint image preprocessing, data feature extraction, feature matching, fingerprint recognition, etc., and may be implemented by various algorithms. These algorithms are mature existing arts, have been applied to various encryption and decryption fields, and are no longer repeated herein.

The present invention has the following advantages: the sensing units are arranged below the fingerprint recognition region of the display unit, so that when the user operates the application icon on the screen, the fingerprint information of the user can be immediately collected, and then the collected fingerprint information is compared with the preset fingerprint information to implement starting or unlocking of the application. Compared with a mode that the fingerprint must be verified by the sensor outside the display screen before starting the application in existing mobile equipment, the method provided by the invention expands an operable space of the user on the screen, improves operability of the user to directly unlock the application icon on the screen by the fingerprint and improves the user experience on one hand, and may realize a function of fingerprint recognition in the screen by means of the operability for full-screen, thinned and lightened terminals to meet the needs of the market on the other hand.

Figure 2:
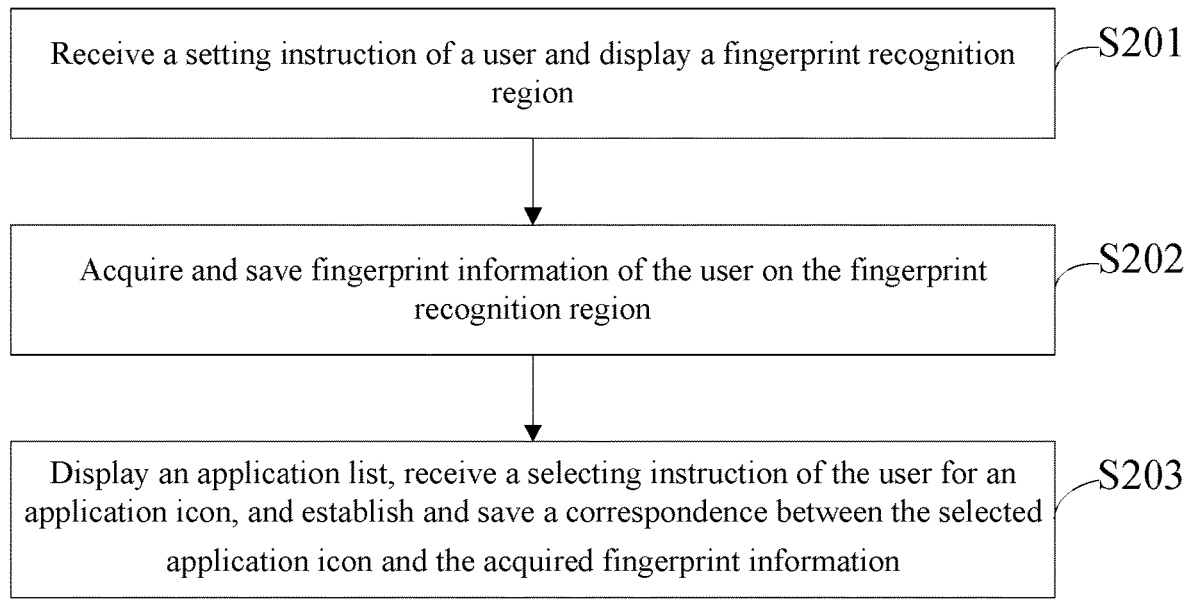
FIG. 2 is a flow chart of a method for starting an application based on fingerprint recognition according to another embodiment of the present invention.

As seen from FIG. 2, it is a flowchart of a method for starting an application based on fingerprint recognition according to another embodiment of the present invention. The step of "presetting the correspondence between the application icon and the fingerprint information" includes:

First, the process proceeds to a step S201 of receiving a setting instruction of the user and displaying the fingerprint recognition region. The setting instruction may be triggered by clicking on a button in a setting column on the screen by the user. The device will display the fingerprint recognition region after receiving the setting instruction so that the user can input the fingerprint information. In the present embodiment, the step of displaying the fingerprint recognition region may include: the brightness of the fingerprint recognition region is enhanced or a prompt input box is displayed on the fingerprint recognition region. In some embodiments, the method further includes a step of receiving account information of the user before receiving the setting instruction of the user, wherein the account information includes a user ID and a password. The setting instruction can be triggered only after the user inputs the correct user ID and password to login a user account, so that the fingerprint information setting security can be improved on one hand, and an effect that different users can be distinguished and different fingerprint information and the corresponding application icons can be saved on one device can be achieved on the other hand.

Then, the process proceeds to a step S202 of acquiring and saving the fingerprint information of the user on the fingerprint recognition region. The collected fingerprint information is the preset fingerprint information when a finger end of the user is in contact with the fingerprint recognition region; and the collected information is stored in the storage unit.

Then, the process proceeds to a step S203 of displaying an application list, receiving a selecting instruction of the user for the application icon, and establishing and saving the correspondence between the selected application icon and the acquired fingerprint information. The selecting instruction may be triggered in a mode of clicking to check, double clicking or the like by the user. In this way, the user can set that the applications with more important information security may be encrypted or started only by adopting the fingerprint information according to own needs. For the applications with less important information security, no options are set; and these applications may be started by directly clicking and starting without moving to the fingerprint recognition region for unlocking during starting or decryption.

In some embodiments, the method further includes a step of sending prompt information when the preset fingerprint information matched with the acquired fingerprint information is not recognized. The prompt information includes one or more of voice prompt information, image prompt information, light prompt information and video prompt information. "The preset fingerprint information matched with the acquired fingerprint information is not recognized" usually includes the following two situations: one is that the fingerprint recognition fails, i.e., the fingerprint information is pre-stored in the storage unit, but the collected fingerprint information is not complete due to the finger end of the user is not in full contact with the screen when acquiring the fingerprint information of the user, thereby causing failure of fingerprint recognition; and the other is that the fingerprint information is not stored in the storage unit.

For the first situation, the device may send the voice prompt information or the image prompt information when the preset fingerprint information matched with the acquired fingerprint information is not recognized. The voice prompt information includes voice prompt information for prompting the user to input the fingerprint again. The image prompt information includes pop-up prompt information for prompting the user to input the fingerprint again. It is determined that the fingerprint information is not stored in the storage unit when the number of times for acquiring the fingerprint information inputted by the user exceeds a preset number and the preset fingerprint information matched with the acquired fingerprint information is not recognized.

For the second situation, the device can also send the image prompt information, e.g., a pop-up window prompts the user to enter the current fingerprint information, and can also send the video prompt information, wherein the video prompt information includes a tutorial on how to enter new fingerprint information, and the user can enter the new fingerprint information according to the video prompt information. Certainly, the prompt information can also be realized in a mode of vibration, light sensation prompt or the like. In short, the prompt information is only used for making the user know a situation that "no fingerprint information is matched with the fingerprint information acquired at this time" as soon as possible; and the selection of a prompt information form can be correspondingly adjusted according to settings of different manufacturers.

When the user operates the application icon on the screen, the user may want to start the application corresponding to the application icon, or sort the application icon. In order to distinguish the two, in some embodiments, the method includes: an application icon sorting function is started to sort the application icon when a time of acquiring the fingerprint information of the user on the fingerprint recognition region exceeds a preset time threshold. The process of "sorting the application icon" includes: a coordinate movement instruction of the user for the application icon is received; and the application icon is moved from a current position to a target position. The selection of the preset time threshold may be determined according to actual needs, e.g., it may be determined as a value of 1-3 seconds. The target position may be positions of other application icons in a page where the application icon to be sorted is located, a position of a folder in a page where the application icon to be sorted is located, or positions of the folders or other application icons in other pages beyond the page where the application icon to be sorted is located.

In some embodiments, the fingerprint recognition region includes a plurality of fingerprint recognition sub-regions; and a sensing unit is correspondingly arranged below each of the fingerprint recognition sub-regions. The device further includes a sensing unit control circuit. The method further includes steps of receiving a starting instruction of the user for the fingerprint recognition sub-regions, turning on the sensing units below the fingerprint recognition sub-regions by the sensing unit control circuit, receiving a turn-off instruction of the user for the fingerprint recognition sub-regions, and turning off the sensing units below the fingerprint recognition sub-regions by the sensing unit control circuit.

For example, the number of fingerprint recognition sub-regions is two, then, the two fingerprint recognition sub-regions may be uniformly distributed in the screen up and down or one left and one right, may also be distributed in the screen in other arrangement modes, and specifically may be determined by a shape of the sensing units. For convenience of description, the two fingerprint recognition sub-regions are respectively a first fingerprint recognition sub-region and a second fingerprint recognition sub-region; a first sensing unit is arranged below the first fingerprint recognition sub-region; and a second sensing unit is correspondingly arranged below the second fingerprint recognition sub-region.

An application process of the device with two fingerprint recognition sub-regions is specifically described as follows: during use, the user turns on the first sensing unit below the first fingerprint recognition sub-region by the starting instruction, and turns off the second sensing unit below the second fingerprint recognition sub-region by the turn-off instruction. A second sensor below the second fingerprint recognition sub-region is in a turn-off state, so the fingerprint information is not entered when the finger end of the user operates thereon, and the user can freely move and sort the application icons located in the second fingerprint recognition sub-region. When the user needs to unlock or start the application, only the application icon corresponding to the application needs to be dragged from the second fingerprint recognition sub-region to the first fingerprint recognition sub-region. Because the first sensing unit below the first fingerprint recognition sub-region is in a turn-on state, when the finger end of the user is located in the first fingerprint recognition sub-region, the fingerprint information of the user will be collected synchronously, and then the collected fingerprint information is compared with the preset fingerprint information to realize starting and unlocking of the application. By adopting the above solution, the application icon corresponding to the application to be started is unnecessary to be arranged in a periphery of the fingerprint recognition region at the beginning, and may also be arranged in the fingerprint recognition region. In order to avoid misoperation of the user, only the sensing unit below the fingerprint recognition region needs to be set in the turn-off state by the sensing unit control circuit, thereby effectively improving sensory experience of the user.

In other embodiments, the number of fingerprint recognition sub-regions may also be other values, which may be set according to actual needs. The turn-on or turn-off state of the sensing unit below each fingerprint recognition sub-region can be set according to own preferences of the user.

In some embodiments, when the display unit is the LCD screen, a backlight unit is further arranged below the sensing units; and the sensing units are arranged between the backlight unit and the LCD screen. Since the LCD screen is not a self-illuminating component, the backlight unit needs to be added below the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be increased.

In the present embodiment, the applications include one or more of images, videos, audios and mobile terminal software. When the applications are the images, videos or audios, the application icons corresponding to the applications may be thumbnails corresponding to the applications, or may also be customized icons to be decrypted. During use, the user can drag the thumbnail or the icon to be decrypted into the fingerprint recognition region to complete the unlocking and then view the corresponding image, video or audio. For the mobile terminal software, the application icons are icons when downloading the mobile terminal software; and the user can drag these icons into the fingerprint recognition region and start the mobile terminal software after the fingerprint information is successfully matched.

Figure 4:
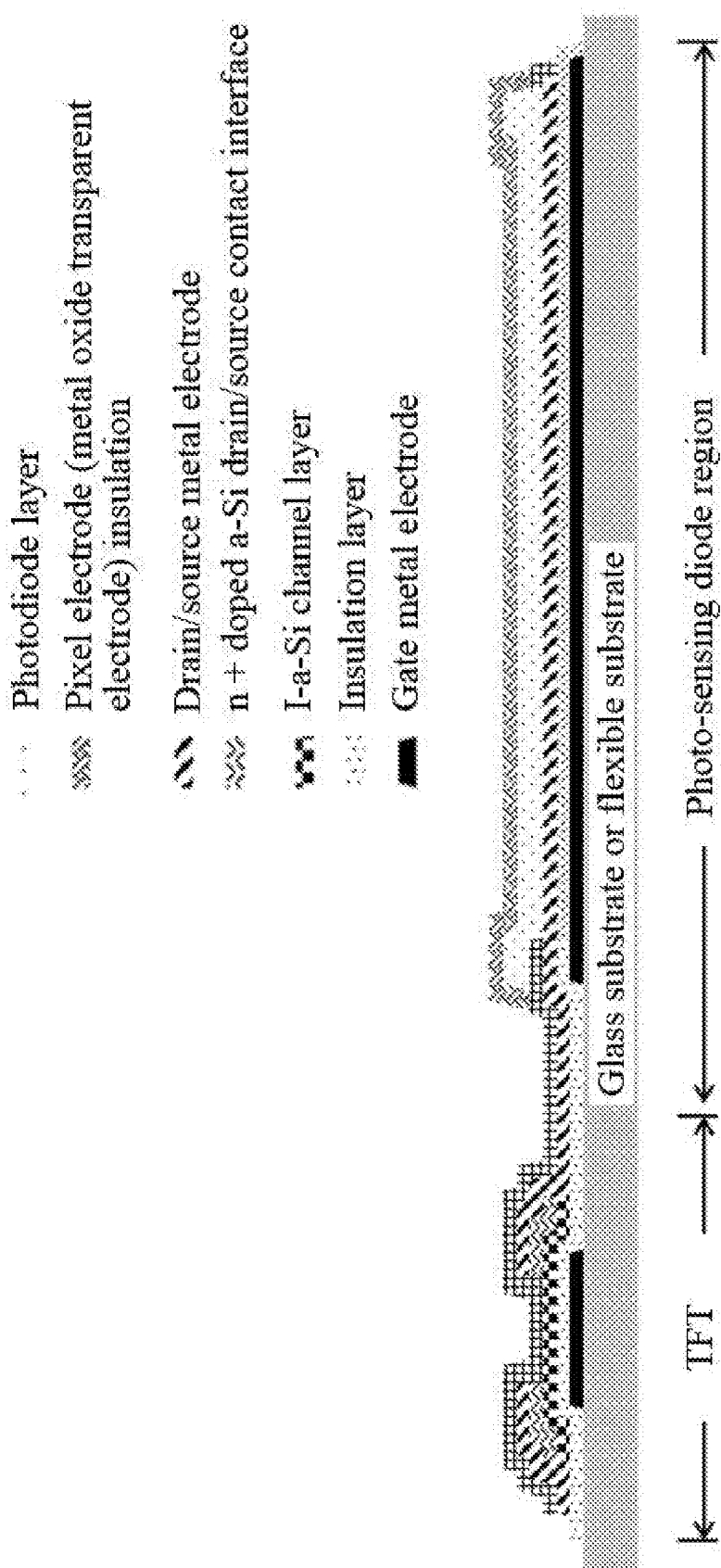
FIG. 4 is a schematic diagram of a sensing unit according to an embodiment of the present invention.

In the present embodiment, each sensing unit includes a TFT image sensing array film. An LCD screen or an Organic Light Emitting Diode (OLED) display screen is driven by a TFT structure to scan a single pixel to realize a display function of a pixel array on the panel. A main structure for forming a TFT switching function is an MOSFET (Metal Oxide Semiconductor Field Effect Transistor), wherein well-known semiconductor layer materials mainly include amorphous silicon, polycrystalline silicon, indium gallium zinc oxide (IGZO), organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 4). A specific structure may refer to descriptions on the structure of the sensing unit in a U.S. Pat. No. 6,943,070B2 and a PRC patent CN204808361U. A production process of the TFT image sensing array film is different from that of a TFT structure of the display screen in that an original pixel starting region of the display screen is changed to a photo-sensing in the production process. The TFT may be prepared by a method of using thin glass as a substrate or using a high temperature-resistant plastic material as the substrate, as described in the U.S. Pat. No. 6,943,070B2.

As seen from FIG. 3, it is a schematic diagram of a device for starting the application based on fingerprint recognition according to an embodiment of the present invention. The device is electronic equipment with a touch display screen, such as a mobile phone, a table computer, a personal digital assistant and other smart mobile equipment, and may also be a personal computer, a computer for industrial equipment or other electronic equipment. The device includes a display unit 101 and sensing units 102, wherein the display unit 101 is provided with a fingerprint recognition region; the sensing units 102 are located below the fingerprint recognition region for acquiring fingerprint information on the fingerprint recognition region. The device further includes a fingerprint information setting unit 104, an operating instruction receiving unit 105 and a processing unit 106.

The fingerprint information setting unit 104 is configured to preset a correspondence between the application icon and the fingerprint information. The application icon is a thumbnail of the application; each application icon corresponds to one application; and a starting instruction for the application is triggered when the user clicks on the application icon. In the present embodiments, the application includes one or more of images, videos, audios and mobile terminal software (e.g., various APPs on a mobile phone). The preset fingerprint information is the fingerprint information entered and stored by the user in advance, wherein each fingerprint information may be associated with one or more application icons; and the correspondence between the application icon and the fingerprint information is stored. The correspondence between the application icon and the fingerprint information may be stored in a storage unit of the device, such as a memory of the mobile phone or a hard disk of the computer, and may also be stored in the storage unit of a server. The device only needs to establish a communication connection with the server and then acquires the prestored fingerprint information from the server when the correspondence between the preset application icon and the fingerprint information needs to be acquired. The communication connection includes a wired communication connection or a wireless communication connection.

The operating instruction receiving unit 105 is configured to receive operating information for the application icon and move the application icon to the fingerprint recognition region. In the present embodiment, the initial position of the application icon is located at the periphery of the fingerprint recognition region, wherein the application icon refers to an application icon corresponding to the application which needs to be unlocked or started. For other application icons, the initial positions on the screen are not limited, i.e., may be located at the periphery of the fingerprint recognition region or in the fingerprint recognition region.

In some embodiments, the operating instruction receiving unit 105 is configured to receive a dragging instruction of the user for the application icon and move the application icon from the initial position to the fingerprint recognition region. The user can first click to select the application icon to be moved, then directly move the application icon from the initial position to the fingerprint recognition region by sliding of a finger, and trigger the dragging instruction. Certainly, the user can also move the application icon to the fingerprint recognition region after selecting the application icon to be moved and moving a certain touch track, to trigger the dragging instruction. In short, a sliding track of the application icon can be customized according to preferences of the user as long as an end point of the application icon after moving is ensured to be located within the range of the fingerprint recognition region.

In some embodiments, the initial position of the application icon is located at the periphery of the fingerprint recognition region. The operating instruction receiving unit 105 is configured to receive the touching instruction of the user for the application icon and move the application icon from the initial position to the fingerprint region. The touching instruction includes the clicking instruction or the button moving instruction.

When the touching instruction is the clicking instruction, "the operating instruction receiving unit 105 is configured to receive the operating information of the user for the application icon and move the application icon from the initial position to the fingerprint region" may be implemented in a mode of setting the correspondence between the number of contacts of the application icon and a touch command, triggering the clicking instruction when detecting that the number of contacts meets requirements, and moving the application icon from the initial position to the fingerprint recognition region. For example, the user can preset the clicking instruction of quick double click to trigger the application icon to move, so the user just needs quick double click on the application icon corresponding to the application on the screen to quickly move the application icon from the initial position to the fingerprint recognition region when needing to unlock or start the application. In addition, the user can also trigger the clicking instruction in a mode of setting a preset button, e.g., a "move" button may be additionally set on the screen, and clicking on the "move" button to quickly move the application icon to the fingerprint recognition region after the user clicks to select the application icon to be moved.

When the touching instruction is the button moving instruction, "the operating instruction receiving unit 105 is configured to receive the operating information for the application icon and move the application icon from the initial position to the fingerprint region" may be implemented in a mode of displaying a virtual manipulation keyboard containing direction keys (for example, including four directions up, down, left and right) on the screen after the user selects the application icon corresponding to the application to be unlocked or started; and the operating instruction receiving unit 105 receives operations of the user on a direction key "up" of the virtual keyboard, and moves the application icon from the initial position to the fingerprint recognition region. In addition, for the device with a mechanical button, the operating instruction of the user on the mechanical button is received to move the application icon from the initial position to the fingerprint recognition region after the user selects the application icon corresponding to the application to be unlocked or started.

The sensing units 102 are configured to acquire the fingerprint information of a current user located on the fingerprint recognition region. When the device receives a dragging instruction of the user, a hand of the user moves away from the screen after moving the application icon from an initial position to the fingerprint recognition region, and the sensing units are arranged below the fingerprint recognition region, so the sensing units can synchronously collect the fingerprint information of the user when the hand of the user is located within the range of the fingerprint recognition region. When the device receives a touching instruction of the user, the user can press the fingerprint recognition region by the hand after moving the application icon of the application to be unlocked or started to the fingerprint recognition region, so that the device can receive the fingerprint information of the user.

The processing unit 106 is configured to compare the acquired fingerprint information with the preset fingerprint information corresponding to the application icon, start the application corresponding to the application icon when matching successfully, otherwise not start the application corresponding to the application icon. Comparison of the fingerprint information may be implemented by a fingerprint recognition algorithm, which may be stored in the storage unit of the device. A processor of the device will take the fingerprint recognition algorithm in the storage unit after the sensing units acquire the fingerprint information on the fingerprint recognition region, and compare the acquired fingerprint information with the preset fingerprint information to judge whether the two are matched. The fingerprint recognition algorithm includes steps of fingerprint image preprocessing, data feature extraction, feature matching, fingerprint recognition, etc., and may be implemented by various algorithms. These algorithms are mature existing arts, have been applied to various encryption and decryption fields, and are no longer repeated herein.

In some embodiments, "the fingerprint information setting unit is configured to preset the correspondence between the application icon and the fingerprint information" includes:

The operating instruction receiving unit 105 is configured to receive a setting instruction of the user; and the display unit is configured to display the fingerprint recognition region. The setting instruction may be triggered by clicking on a button in a setting column on the screen by the user. The device will display the fingerprint recognition region after receiving the setting instruction so that the user can input the fingerprint information. In the present embodiment, the process of displaying the fingerprint recognition region may include: the brightness of the fingerprint recognition region is enhanced or a prompt input box is displayed on the fingerprint recognition region. In some embodiments, the process further includes a step of receiving account information of the user before receiving the setting instruction of the user, wherein the account information includes a user ID and a password. The setting instruction can be triggered only after the user inputs the correct user ID and password to login a user account, so that the fingerprint information setting security can be improved on one hand, and an effect that different users can be distinguished and different fingerprint information and the corresponding application icons can be saved on one device can be achieved on the other hand.

The sensing units 102 are configured to acquire and save the fingerprint information of the user on the fingerprint recognition region. The collected fingerprint information is the preset fingerprint information when a finger end of the user is in contact with the fingerprint recognition region; and the collected information is stored in the storage unit.

The display unit 101 is configured to display an application list; the operating instruction receiving unit 105 is configured to receive a selecting instruction of the user for the application icon; and the processing unit is configured to establish and save the correspondence between the selected application icon and the acquired fingerprint information. The selecting instruction may be triggered in a mode of clicking to check, double clicking or the like by the user. In this way, the user can set that the more important applications may be encrypted or started only by adopting the fingerprint information according to own needs. For the less important applications, no options are set; and these applications may be started by directly clicking and starting without moving to the fingerprint recognition region for unlocking during starting or decryption.

In some embodiments, the processing unit 106 is configured to send prompt information when the preset fingerprint information matched with the acquired fingerprint information is not recognized. The prompt information includes one or more of voice prompt information, image prompt information, light prompt information and video prompt information. "The preset fingerprint information matched with the acquired fingerprint information is not recognized" usually includes the following two situations: one is that the fingerprint recognition fails, i.e., the fingerprint information is pre-stored in the storage unit, but the collected fingerprint information is not complete due to the finger end of the user is not in full contact with the screen when acquiring the fingerprint information of the user, thereby causing failure of fingerprint recognition; and the other is that the fingerprint information is not stored in the storage unit.

For the first situation, the processing unit 106 may send the voice prompt information or the image prompt information when the preset fingerprint information matched with the acquired fingerprint information is not recognized. The voice prompt information includes voice prompt information for prompting the user to input the fingerprint again. The image prompt information includes pop-up prompt information for prompting the user to input the fingerprint again. It is determined that the fingerprint information is not stored in the storage unit when the number of times for acquiring the fingerprint information inputted by the user exceeds the preset number and the preset fingerprint information matched with the acquired fingerprint information is not recognized, i.e., the other situation mentioned above.

For the second situation, the processing unit 106 can also send the image prompt information, e.g., a pop-up window prompts the user to enter the current fingerprint information, and can also send the video prompt information, wherein the video prompt information includes a tutorial on how to enter new fingerprint information, and the user can enter the new fingerprint information according to the video prompt information. Certainly, the prompt information can also be realized in a mode of vibration, light sensation prompt or the like. In short, the prompt information is only used for making the user know a situation that "no fingerprint information is matched with the fingerprint information acquired at this time" as soon as possible; and the selection of a prompt information form can be correspondingly adjusted according to settings of different manufacturers.

When the user operates the application icon on the screen, the user may want to start the application corresponding to the application icon, or sort the application icon. In order to distinguish the two, in some embodiments, the processing unit 106 is further configured to start an application icon sorting function to sort the application icon when a time of acquiring the fingerprint information of the user on the fingerprint recognition region exceeds a preset time threshold. "The processing unit is configured to sort the application icon" includes: the processing unit 106 is configured to receive a coordinate movement instruction of the user for the application icon and move the application icon from a current position to a target position. The selection of the preset time threshold may be determined according to actual needs, e.g., it may be determined as a value of 1-3 seconds. The target position may be positions of other application icons in a page where the application icon to be sorted is located, a position of a folder in a page where the application icon to be sorted is located, or positions of the folders or other application icons in other pages beyond the page where the application icon to be sorted is located.

In some embodiments, the fingerprint recognition region includes a plurality of fingerprint recognition sub-regions; and a sensing unit is correspondingly arranged below each of the fingerprint recognition sub-regions. The device further includes a sensing unit control circuit. The operating instruction receiving unit is further configured to receive a starting instruction of the user for the fingerprint recognition sub-regions. The sensing unit control circuit is configured to turn on the sensing units below the fingerprint recognition sub-regions. The operating instruction receiving unit is configured to receive a turn-off instruction of the user for the fingerprint recognition sub-regions. The sensing unit control circuit is configured to turn off the sensing units below the fingerprint recognition sub-regions.

For example, the number of fingerprint recognition sub-regions is two, then, the two fingerprint recognition sub-regions may be uniformly distributed in the screen up and down or one left and one right, may also be distributed in the screen in other arrangement modes, and specifically may be determined by a shape of the sensing units. For convenience of description, the two fingerprint recognition sub-regions are respectively a first fingerprint recognition sub-region and a second fingerprint recognition sub-region; a first sensing unit is arranged below the first fingerprint recognition sub-region; and a second sensing unit is correspondingly arranged below the second fingerprint recognition sub-region.

An application process of the device with two fingerprint recognition sub-regions is specifically described as follows: during use, the user turns on the first sensing unit below the first fingerprint recognition sub-region by the starting instruction, and turns off the second sensing unit below the second fingerprint recognition sub-region by the turn-off instruction. A second sensor below the second fingerprint recognition sub-region is in a turn-off state, so the fingerprint information is not entered when the finger end of the user operates thereon, and the user can freely move and sort the application icons located in the second fingerprint recognition sub-region. When the user needs to unlock or start the application, only the application icon corresponding to the application needs to be dragged from the second fingerprint recognition sub-region to the first fingerprint recognition sub-region. Because the first sensing unit below the first fingerprint recognition sub-region is in a turn-on state, when the finger end of the user is located in the first fingerprint recognition sub-region, the fingerprint information of the user will be collected synchronously, and then the collected fingerprint information is compared with the preset fingerprint information to realize starting and unlocking of the application. By adopting the above solution, the application icon corresponding to the application to be started is unnecessary to be arranged in a periphery of the fingerprint recognition region at the beginning, and may also be arranged in the fingerprint recognition region. In order to avoid misoperation of the user, only the sensing unit below the fingerprint recognition region needs to be set in the turn-off state by the sensing unit control circuit, thereby effectively improving sensory experience of the user.

In other embodiments, the number of fingerprint recognition sub-regions may also be other values, which may be set according to actual needs. The turn-on or turn-off state of the sensing unit below each fingerprint recognition sub-region can be set according to own preferences of the user.

Figure 5:
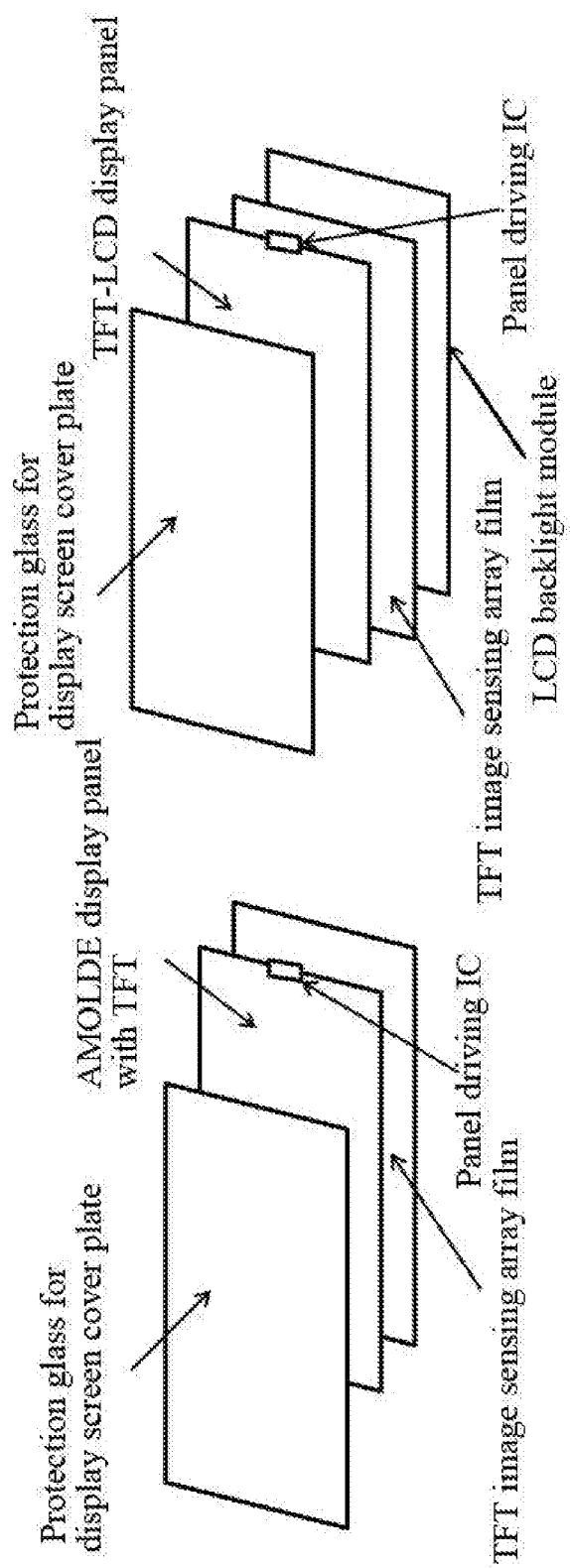
FIG. 5 is a schematic diagram of a device for starting an application based on fingerprint recognition according to another embodiment of the present invention.

As shown in FIG. 5, in some embodiments, the display unit includes an AMOLED display screen or an LCD screen.

When the display unit is the LCD screen, a backlight unit is further arranged below the sensing units; and the sensing units are arranged between the backlight unit and the LCD screen. Since the LCD screen is not a self-illuminating component, the backlight unit needs to be added below the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be increased.

In the present embodiment, the applications include one or more of images, videos, audios and mobile terminal software. When the applications are the images, videos or audios, the application icons corresponding to the applications may be thumbnails corresponding to the applications, or may also be customized icons to be decrypted. During use, the user can drag the thumbnail or the icon to be decrypted into the fingerprint recognition region to complete the unlocking and then view the corresponding image, video or audio. For the mobile terminal software, the application icons are icons when downloading the mobile terminal software; and the user can drag these icons into the fingerprint recognition region and start the mobile terminal software after the fingerprint information is successfully matched.

As shown in FIG. 5, in the present embodiment, each sensing unit includes a TFT image sensing array film. An LCD screen or an OLED display screen is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 4). A specific structure may refer to descriptions on the structure of the sensing unit in a U.S. Pat. No. 6,943,070B2 and a PRC patent CN204808361U. A production process of the TFT image sensing array film is different from that of a TFT structure of the display screen in that an original pixel starting region of the display screen is changed to a photo-sensing in the production process. The TFT may be prepared by a method of using thin glass as a substrate or using a high temperature-resistant plastic material as the substrate, as described in the U.S. Pat. No. 6,943,070B2.

The present invention has the following advantages: the sensing units are arranged below the fingerprint recognition region of the display unit, so when a user operates the application icon on the screen, the fingerprint information of the user may be immediately collected, and then the collected fingerprint information is compared with the preset fingerprint information to implement starting or unlocking of the application. Compared with a mode that the fingerprint must be verified by the sensor outside the display screen before starting the application in existing mobile terminal equipment, the method provided by the invention improves operability of the user to directly unlock the application icon on the screen by fingerprint and improves the user experience on one hand, and may realize a function of fingerprint recognition in the screen by means of the operability for full-screen, thinned and lightened terminals to meet the needs of the market on the other hand.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the foregoing embodiments are described, once a person skilled in the art learns a basic inventive concept, the person skilled in the art may make additional changes and modifications to these embodiments. Therefore, the foregoing descriptions are merely embodiments of the present invention, and are not intended to limit the patent protection scope of the present invention. Any equivalent structural change or any equivalent process change that is made by using the contents of the description and the accompanying drawings of the present invention is directly or indirectly applied to technical fields related thereto, and likewise falls into the patent protection scope of the present invention.

I claim:

1. A method for starting an application based on fingerprint recognition applied to a device for starting the application based on fingerprint recognition; wherein the device comprises a display unit and a sensing unit, the display unit is provided with a fingerprint recognition region, the sensing unit is configured for acquiring fingerprint information on the fingerprint recognition region;

wherein the fingerprint recognition region comprises a first fingerprint recognition sub-region and a second fingerprint recognition sub-region, the device comprises a first sensing unit and a second sensing unit, the first sensing unit is configured for acquiring fingerprint information on the first fingerprint recognition sub-region and the second sensing unit is configured for acquiring fingerprint information on the second fingerprint recognition sub-region; and the method comprises:
- turning on the first sensing unit in response to receiving a starting instruction of a user for starting the first fingerprint recognition sub-region and turning off the second sensing unit in response to receiving a turn-off instruction of the user for turning off the second fingerprint recognition sub-region;
- receiving an operating information of the user for operating the application icon and moving the application icon from the second fingerprint recognition sub-region to the first fingerprint recognition sub-region upon the application icon being initially located in the second fingerprint recognition sub-region; and
- acquiring, by the first sensing unit, the fingerprint information of the user on the first fingerprint recognition sub-region and controlling starting of the application based on the acquired fingerprint information.

2. The method of claim 1, further comprising, presetting a correspondence between the application and a preset fingerprint information;
wherein presetting a correspondence between the application icon and a preset fingerprint information comprises:
- receiving a setting instruction of the user and displaying the fingerprint recognition region;
- acquiring fingerprint information of the user on the fingerprint recognition region; and saving the acquired fingerprint information as the preset fingerprint information; and
- displaying an application list, receiving a selecting instruction of the user for the application icon, establishing and saving the correspondence between the selected application icon and the preset fingerprint information.

3. The method of claim 2, wherein controlling starting of the application based on the fingerprint information of the user on the first fingerprint recognition sub-region acquired by the first sensing unit comprises: comparing the fingerprint information on the first fingerprint recognition sub-region acquired by the first sensing unit with the preset fingerprint information corresponding to the application icon to determine whether they are matched with each other, and if they are matched successfully, the processing unit is configured to start the application corresponding to the application icon.

4. The method of claim 1, wherein an initial position of the application icon is disposed out of the fingerprint recognition region, the method further comprising: moving the application icon from the initial position to the fingerprint recognition region.

5. The method of claim 4, wherein moving the application icon from the initial position to the fingerprint recognition region comprises:
- receiving a touching instruction of the user for the application icon and moving the application icon from the initial position to the fingerprint recognition region, wherein the touching instruction comprises a clicking instruction or a button moving instruction;
- receiving a dragging instruction of the user for dragging the application icon and moving the application icon from the initial position to the fingerprint recognition region.

6. The method of claim 1, wherein the method comprises: starting an application icon sorting function to sort the application icon when a time of acquiring the fingerprint information of the user on the fingerprint recognition region exceeds a preset time threshold.

7. The method of claim 6, wherein the process of "sorting the application icon" comprises:
- receiving a coordinate movement instruction of the user for moving the application icon and moving the application icon from a current position to a target position.

8. The method of claim 1, wherein the display unit comprises an Active Matrix Organic Light Emitting Diode (AMOLED) display screen or a Liquid Crystal Display (LCD) screen.

9. The method of claim 8, wherein when the display unit is the LCD screen, the device further comprises a backlight unit arranged below the sensing unit, and the sensing unit is arranged between the backlight unit and the LCD screen.

10. The method of claim 1, wherein the sensing unit comprises a TFT (Thin Film Transistor) image sensing array film.

11. The method of claim 1, wherein the application comprises one or more of image software, video software, audio software and mobile terminal software.

12. A device for starting an application based on fingerprint recognition comprising a display unit and a sensing unit, wherein the display unit is provided with a fingerprint recognition region, the sensing unit is configured for acquiring fingerprint information on the fingerprint recognition region;
wherein the fingerprint recognition region comprises a first fingerprint recognition sub-region and a second fingerprint recognition sub-region, the device comprises a first sensing unit and a second sensing unit, the first sensing unit is configured for acquiring fingerprint information on the first fingerprint recognition sub-region and the second sensing unit is configured for acquiring fingerprint information on the second fingerprint recognition sub-region;
the device further comprises a sensing unit controlling circuit, an operating instruction receiving unit and a processing unit;
wherein the sensing unit controlling circuit is configured for turning on the first sensing unit when the operating instruction receiving unit receiving a starting instruction of the user for starting the first fingerprint recognition sub-region, and the sensing unit controlling circuit is configured for turning off the second sensing unit when the operating instruction receiving unit receiving a turn-off instruction of the user for turning off the second fingerprint recognition sub-region;
the operating instruction receiving unit is configured for receiving operating information of the user for operating the application icon and moving the application icon from the second fingerprint recognition sub-region to the first fingerprint recognition sub-region upon the application icon being initially located in the second fingerprint recognition sub-region;
wherein the processing unit is configured to controlling starting of the application based on the fingerprint information on the first fingerprint recognition sub-region acquired by the first sensing unit.

13. The device of claim 12, further comprising a fingerprint information setting unit;
Wherein the fingerprint information setting unit is configured to preset a correspondence between the application and a preset fingerprint information, the operating instruction receiving unit is configured to receive a setting instruction of the user, and the display unit is configured to display the fingerprint recognition region;

the sensing unit is configured to acquire fingerprint information of the user on the fingerprint recognition region and save the acquired fingerprint information as the preset fingerprint information;

the display unit is configured to display an application list; and the operating instruction receiving unit is configured to receive a selecting instruction of the user for selecting the application icon, and the processing unit is configured to establish and save the correspondence between the selected application icon and the preset fingerprint information.

14. The device of claim 13, wherein the processing unit being configured to controlling starting of the application based on the fingerprint information on the first fingerprint recognition sub-region acquired by the first sensing unit comprises: the processing unit is configured to compare the fingerprint information on the first fingerprint recognition sub-region acquired by the first sensing unit with the preset fingerprint information corresponding to the application icon to determine whether they are matched with each other, and if they are matched successfully, the processing unit is configured to start the application corresponding to the application icon.

15. The device of claim 12, wherein the initial position of the application icon is located out of the fingerprint recognition region, the operating instruction receiving unit is further configured to move the application icon from the initial position to the fingerprint recognition region.

16. The device of claim 15, wherein the operating instruction receiving unit is further configured to receive the touching instruction of the user for the application icon and move the application icon from the initial position to the fingerprint recognition region; and the touching instruction comprises the clicking instruction or the button moving instruction;

or the operating instruction receiving unit is further configured to receive a dragging instruction of the user for dragging the application icon and move the application icon from the initial position to the fingerprint recognition region.

17. The device of claim 12, wherein the processing unit is further configured to start an application icon sorting function to sort the application icon when a time of acquiring the fingerprint information of the user on the fingerprint recognition region exceeds a preset time threshold.

18. The device of claim 17, wherein the processing unit being configured to sort the application icon comprises: the processing unit is configured to receive a coordinate movement instruction of the user for moving the application icon and move the application icon from a current position to a target position.

19. The device of claim 12, wherein the display unit comprises an AMOLED display screen or an LCD screen.

20. The device of claim 19, wherein when the display unit is the LCD screen, the device further comprises a backlight unit arranged below the sensing unit, and the sensing unit is arranged between the backlight unit and the LCD screen.

21. The device of claim 12, wherein the sensing unit comprises a TFT image sensing array film.

22. The device of claim 12, wherein the application comprises one or more of image software, video software, audio software and mobile terminal software.

* * * * *